Dec. 22, 1959     L. R. YESKE     2,918,256
JACK
Filed May 1, 1957
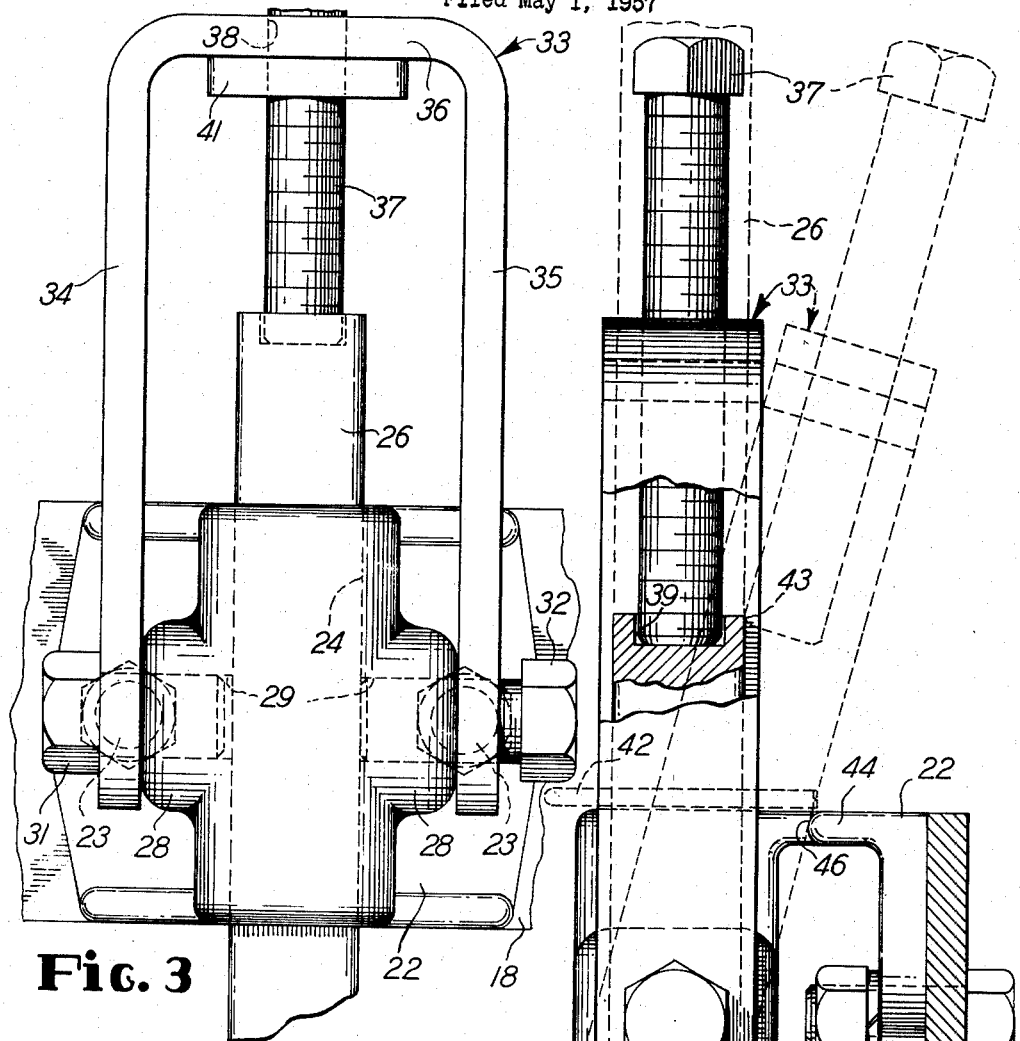
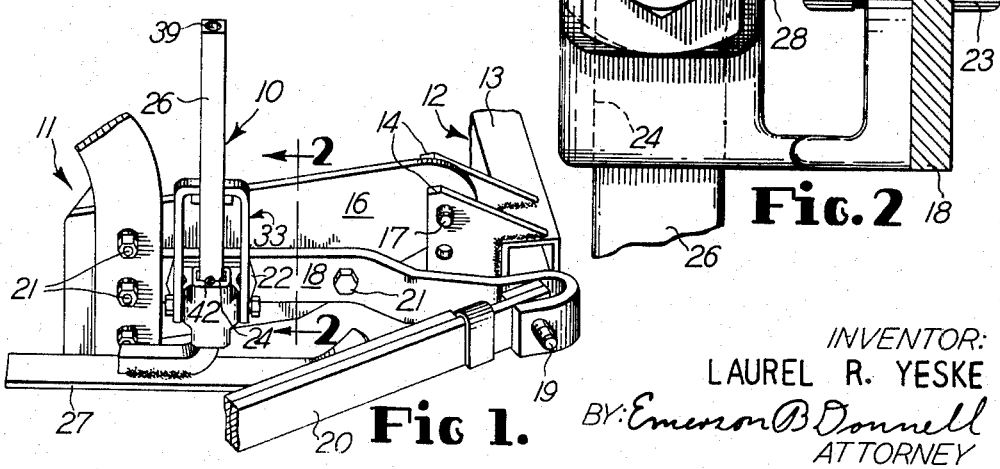
INVENTOR:
LAUREL R. YESKE
BY: Emerson B Donnell
ATTORNEY

United States Patent Office 2,918,256
Patented Dec. 22, 1959

2,918,256

JACK

Laurel R. Yeske, Loves Park, Ill., assignor to J. I. Case Company, Racine, Wis., a corporation of Wisconsin Application May 1, 1957, Serial No. 656,361

3 Claims. (Cl. 254—86)

This invention relates to a stand or jack, and more specifically, it relates to a jack for effecting vertical positions at any exact elevation desired between a low and a high position.

It has been found that the jack of this invention is particularly useful for elevating the hitch end of a farm implement to the desired elevation for hitching the implement to a tractor. Thus, this invention will be described with reference to that use, and it is further preferred that the jack be permanently attached to the implement, even while the latter is being used.

It is an object of this invention to provide a jack which effects exact elevations between a low and a high position. In accomplishing this object, a pin connection between a fixed point on a tractor and the hitch means of an implement can be made with a minimum of effort and time.

Still another object of this invention is to provide a jack which can be permanently attached to the item on which the jack is used such that the jack can travel with the item without being removed from a position ready for jacking.

A further object of this invention is to provide a jack which can be attached to a vehicle and remain therewith while the vehicle is moving and having means for simply and readily securing the jack in its inoperative position for movement of the vehicle.

Still another object of this invention is to provide a stand or jack for an implement wherein the jack can be easily and readily placed into and out of working position, can be easily adjusted to exact settings, and can be readily held in an inoperative position in place on said implement without rattling while the implement is being moved.

Other objects and advantages will become apparent upon reading the following description in conjunction with the accompanying drawings, wherein:

Fig. 1 is a side perspective view of a preferred embodiment of a jack of this invention and also showing a fragment of both the tractor hitch and the implement hitch, and showing the jack in the inoperative position.

Fig. 2 is an enlarged sectional view taken along the line 2—2 of Fig. 1, and with parts broken away, and showing in dotted lines the inoperative position of the jack.

Fig. 3 is a side elevational view of a fragment of the jack shown in Fig. 2.

The same reference numerals refer to the same parts throughout the drawings and specification.

As mentioned, Fig. 1 shows the jack 10 mounted on the hitch members 11 of a farm implement, such as a semi-mounted mower, and the members 11 are attached to the hitch members 12 on the rear end of a tractor. Specifically, a fragment of a beam 13 is disposed transverse and attached to the tractor (not shown) to present a pair of spaced apart hitch plates 14 on the rear end of the tractor. A draft plate 16 extends forwardly of the implement, and a pin 17 passes through the plates 14 and 16 to draft attach the implement to the tractor. A plate or arm 18 also extends forwardly of the implement to attach through a pin 19 to an extensible pull bar 20. With this showing, it should be understood that the connection between the implement and the tractor, made by the pin 17, is normally difficult to make since the implement is heavy and unwieldy, and it must, nevertheless, be elevated to align with the tractor hitch. Also, a similar connection must be made on the opposite, unshown side of the implement-tractor combination. Thus, the jack 10 has been found to be important in hitching and unhitching the combination. A somewhat similar application is found in U.S. Patent No. 2,750,205, though many hereinafter described parts are different from the parts of the cited patent. Of course, the plate 16 and the arm 18 are attached together by bolts 21 to be movable as one unit.

Viewing all of the drawings, it will be seen that a jack mounting bracket 22 is secured to the arm 18 by two bolts 23. The bracket 22 contains a vertically disposed square opening 24 in which a stand 26 is vertically slidably supported. The lower end of the stand 26 is shown to have a shoe or base 27 attached thereto for providing good support of the jack on the ground. Each side of the bracket 22 is shown to include a boss 28 with a threaded opening 29. A short bolt 31 is threadedly received in one of the openings 29, and a long bolt 32 is threadedly received in the other of the openings 29. It should also be noticed that a clevis or connector 33 is attached at each of its legs 34 and 35 respectively to the bolts 31 and 32, such that the clevis is pivotal on the bolts between its full-line and its dotted-line positions shown in Fig. 2. However, if the short bolt 31 is sufficiently tight, then the bolt head bears against the leg 34 and the clevis is retained or clamped in a fixed position and cannot pivot on the bolts. Also, if the long bolt 32 is tight, Fig. 3 shows that the inner end of the bolt will abut the stand 26 and thus secure the stand in a fixed position on the bracket 22, without the head of the bolt 32 bearing against the clevis leg 35.

When the clevis 33 is vertical, as shown in full lines in Fig. 2, the clevis intermediate portion 36 is aligned with the stand 26. An adjusting screw 37 threadedly engages a threaded opening 38 in the clevis portion 36 and extends therethrough to be received in a recess 39 in the upper end of the stand 26. It is preferred that a plate 41 be attached to the underneath surface of the clevis portion 36 to present more threads for the screw 37.

With the foregoing described structure, the implement can be accurately elevated when the stand 26 is in the Fig. 2 solid line position and the screw 37 is abutting the upper end of the stand. The bolt 31 will serve to hold the clevis and the stand aligned, and, of course, the bolt 32 will be backed off from the stand to allow the latter to slide freely in the bracket 22. The weight of the implement is then supported on the stand 26 through the screw 37, the clevis 33, and the bolts 31 and 32. The clevis provides a sturdy and well-balanced support.

To go from the jack operating position to the Fig. 1 position and the dotted line Fig. 2 position, the clevis is pivoted to its position toward the center of the implement, and the stand 26 is raised to its shown position. Tightening of the bolt 32, and insertion of a pin 42 through the stand, will secure the stand in the raised position. The screw 37 can be tightened down against the stand 26 to abut the same as shown at 43 in Fig. 2 and to abut a flange 44 of the bracket 22 at 46. In this manner, the stand and the clevis are held secure and held against rattling; also, the bolt 31 can be tightened to hold the clevis in position against rattling.

While a specific embodiment of this invention has been shown and described, it should be obvious that certain changes could be made, and, therefore, the invention

What is claimed is:

1. A jack of the type used on a farm implement for elevating the hitch members thereof to a position of alignment with the hitch members of a tractor, comprising a mounting bracket attached to said hitch members of said implement and having a vertically disposed opening therethrough, a stand axially movably disposed in said opening for vertical movement with respect to said bracket between a lowered implement-supporting position and a raised implement-transport position, a connector having a threaded opening, means for movably attaching said connector to said bracket for movement of said threaded opening into a position of axial alignment with and spaced above said opening in said bracket for said implement-supporting position of said stand and for movement of said threaded opening out of axial alignment with said opening in said bracket for said implement-transport position of said stand, means on said bracket for limiting the movement of said connector in one direction corresponding to said implement-transport position, and a screw threadedly engaged in said threaded opening for axially abutting said stand in said implement-supporting position and for obliquely abutting said stand in said implement-transport position and when said connector is at its limit of movement in said one direction.

2. A jack of the type used on a farm implement for elevating the hitch members thereof to a position of alignment with the hitch members of a tractor, comprising a mounting bracket attached to said hitch members of said implement and having a vertically disposed opening therethrough, a stand axially movably disposed in said opening for vertical movement with respect to said bracket between a lowered implement-supporting position and a raised implement-transport position, a clevis having a threaded opening in the intermediate portion thereof, a bolt threaded into each side of said bracket on a common axis and disposed transverse to said opening in said bracket for pivotally attaching said clevis to said bracket for a first position of said clevis with said threaded opening spaced above and axially alignable with said opening in said bracket, one said bolt being arranged to lock said clevis in selected pivotal positions against said bracket and the other said bolt being arranged to bear against said stand for locking the latter in selected axial positions against said bracket, and a screw threadedly engaged in said threaded opening for axially abutting said stand in said first position of said clevis and when said stand is in said implement-supporting position.

3. A jack for an implement having a frame, said jack comprising a bracket secured to said frame and having a vertically-directed opening therethrough, a stand slidable in said opening for vertical travel to either a supporting or a transport position, a U-shaped clevis pivotally spanning said bracket and having a pair of downwardly directed legs and an intermediate portion extending above and transversely of said opening, said intermediate portion being provided with a threaded aperture co-axial with said opening, in one position of said clevis, a screw engaged in said aperture for abutment with said stand when in said supporting position, and means for pivoting said clevis to a position out of alignment with said opening to permit said stand to travel vertically to said transport position, said means including a headed bolt extending through one of said legs, threaded into said bracket and of a length such that the head thereof will clamp said leg in desired pivoted relation to said bracket in one position of said bolt, and another bolt extended through the other leg, threaded into said bracket and of a length to extend into said vertically directed opening to clamp said stand in desired axial positions relatively to said bracket.

References Cited in the file of this patent
UNITED STATES PATENTS

| | | |
|---|---|---|
| 1,358,462 | Potter | Nov. 9, 1920 |
| 1,547,048 | Klein | July 21, 1925 |
| 2,712,453 | Dion | July 5, 1955 |